United States Patent
Rhein et al.

(10) Patent No.: US 6,962,659 B2
(45) Date of Patent: Nov. 8, 2005

(54) CONTAMINANT SKIMMING DEVICE (75) Inventors: Blake W. Rhein, Poland, OH (US); Frances L. Deley, Jr., Boardman, OH (US)

(73) Assignee: Skimtech, Inc., Youngstown, OH (US)

( * ) Notice: Subject to any disclaimer, the term of this patent is extended or adjusted under 35 U.S.C. 154(b) by 90 days.

(21) Appl. No.: 10/371,577

(22) Filed: Feb. 21, 2003

(65) Prior Publication Data
US 2004/0164014 A1 Aug. 26, 2004

(51) Int. Cl.[7] .............................................. C02F 1/40
(52) U.S. Cl. ................... 210/242.3; 210/526; 210/540; 210/923; 474/176; 474/182
(58) Field of Search .......................... 210/242.3, 242.4, 210/526, 540, 923, 924, 776; 474/174, 176, 474/179, 181, 182

(56) References Cited

U.S. PATENT DOCUMENTS

| | | | |
|---|---|---|---|
| 2,156,920 A * | 5/1939 | Mitcheil ..................... | 474/182 |
| 2,489,178 A * | 11/1949 | Galbreath ................... | 474/181 |
| 2,919,592 A * | 1/1960 | Kramen et al. ............ | 474/181 |
| 2,920,491 A * | 1/1960 | Richards .................... | 474/179 |
| 3,367,199 A * | 2/1968 | Dankowski ................ | 474/182 |
| 3,508,663 A * | 4/1970 | Brill ........................... | 210/924 |
| 3,695,451 A * | 10/1972 | Schmidt ..................... | 210/526 |
| 3,709,369 A * | 1/1973 | Brill et al. .................. | 210/526 |
| 4,089,784 A * | 5/1978 | Ettelt et al. ................ | 210/526 |
| 4,274,957 A * | 6/1981 | Koller ........................ | 210/526 |
| 4,582,604 A * | 4/1986 | Bashaw ...................... | 210/924 |
| 4,652,372 A * | 3/1987 | Threadgill .................. | 210/526 |
| 4,876,011 A * | 10/1989 | Betts et al. ................. | 210/526 |
| 5,015,378 A * | 5/1991 | Lewan et al. .............. | 210/526 |
| 5,080,781 A * | 1/1992 | Evins, IV ................... | 210/170 |
| 5,164,083 A * | 11/1992 | Ahrendt ..................... | 210/242.3 |
| 5,223,128 A * | 6/1993 | Combrowski .............. | 210/242.4 |
| 5,645,733 A * | 7/1997 | Hobson ...................... | 210/242.3 |
| 5,928,520 A * | 7/1999 | Haumesser ................. | 210/540 |

* cited by examiner

*Primary Examiner*—Christopher Upton
(74) *Attorney, Agent, or Firm*—Sand & Sebolt (57) ABSTRACT

An oil skimmer for removing oil floating on surfaces of bodies of water. The oil skimmer includes a support frame, respective drive pulley and guide pulleys rotatably mounted to the support frame on respective shafts, and a drive train which rotatively drives the drive pulley and guide pulleys. A skimmer hose in the form of a loop to which oil adhere floats on the body of water and is driven by the drive pulley through the guide pulley onto and off the surface of the body of water carrying adhered oil. A skimmer hose scraper disposed between the drive and guide pulleys removes the oil from the skimmer hose into a collection receptacle. The drive and guide pulleys comprise replaceable, quick changing inner and outer pulley halves that sandwich respective central hubs therebetween to space the pulley halves to fit skimmer hoses of different cross-sectional sizes. The central hubs with attached drive and guide pulley halves are affixed to the drive shafts using a quick release nut which threads to the shafts. A movable safety housing includes a safety system of horizontal and vertical drive pulley safety blocks affixed thereto which press the skimmer hose into frictional engagement with the drive pulley when assembled in an operative position and releases the skimmer hose when in an inoperative position to stop the skimmer hose. The skimmer hose scraper is adjustable to compensate for varying positioning of the skimmer hose.

34 Claims, 7 Drawing Sheets

CONTAMINANT SKIMMING DEVICE

BACKGROUND OF THE INVENTION

1. Technical Field

Generally, the invention relates to a skimmer apparatus for recovering a less dense liquid which collects on the surface of a denser liquid. More specifically, this invention pertains to a skimmer apparatus which utilizes a moving loop having an outer surface that is preferentially wettable by the less dense liquid. Particularly, the invention relates to an oil skimmer apparatus which utilizes a skimmer hose that floats on the surface of a body of water to collect liquid hydrocarbon contaminants floating on the body of water and releasing the collected liquid hydrocarbons from the hose using a scraper.

2. Background Information

Oil skimmer devices are often used to remove oil and other liquid hydrocarbon contaminants floating on the surface of a body of water such as a water tank to reclaim the oil and make the water environmentally safe for reuse. For example, oil skimming devices are commonly found in the animal rendering industry to separate fat from water. Likewise, oil skimming devices are used in the machine tool industry to separate the waste oil that collects on the surface of the body of cooling water containing various non-oil lubricating agents used to cool and lubricate cutting tools during machining operations. In both industries, it is desirable to separate the fat or oil in order to recover and reuse the water or water with lubricating agents and to avoid environmentally unsatisfactory consequences of discharging fluids mixed with waste fat or oil. Such devices are primarily of a type which utilizes a continuous belt or a continuous hose having a surface which attracts or has a greater affinity for the oil or other liquid hydrocarbon than for the water, commonly called being preferentially wettable by the oil or other liquid hydrocarbon.

Oil skimmer devices which utilize a continuous belt have a lower end of the belt disposed within the body of water contained in a tank, from which the liquid hydrocarbon contaminants are to be removed, while an upper end is disposed outside the tank. A single motor-driven upper roller is typically used to drive the belt and a lower roller is at least partially submerged in the body of water. The liquid hydrocarbon contaminants adhere to the lower end of the belt as it passes through the liquid hydrocarbon contaminants and are carried upwardly to a wiper and/or a pair of squeeze rollers which removes the adhered liquid hydrocarbon contaminants which fall into a hydrocarbon collecting receptacle or a drain connected to a piping system.

For example, in U.S. Pat. No. 5,645,733 issued to Hobson on Jul. 8, 1997 a belt type skimmer for removing floating liquid hydrocarbon contaminants from surfaces of bodies of water is disclosed. The skimmer includes a housing and frame structure which is disposed above the body of water contaminated with liquid hydrocarbons. An idler roller and a pair of coating pinch rollers are rotatively mounted to the housing and frame structure for rotation about generally horizontal axes. An endless belt is looped over the idler roller, between the pinch rollers, and is suspended into the contaminated body of water for the liquid hydrocarbons to adhere thereto. A pair of scrapers are positioned on opposite sides of the belt at a position between the idler roller and the pinch rollers for removing hydrocarbons which have adhered to the belt. A collection receptacle is positioned below the scrapers to receive the liquid hydrocarbons scraped from the belt.

In U.S. Pat. No. 4,582,604 issued to Bashaw on Apr. 15, 1986 there is disclosed another belt type skimmer for removing floating liquid hydrocarbon and other contaminants from a body of water. The skimming apparatus includes a drive roller, and an idler roller having a star-shaped cross-section both of which are rotatably disposed in a spaced apart relationship in a frame disposed above the body of water. An upper end of an endless belt is extended over the drive roller and the idler roller with a lower end of the belt downwardly disposed into the contaminated body of water for contaminants to adhere thereto. One or more scrapers are connected to the frame between the drive roller and the idler roller engaging the belt for removing adhered contaminants. A pressure roller mounted to the frame biases the upper end of the belt into engagement with the drive roller providing friction to drive the belt. A collector is disposed below the scrapers to collect the liquid contaminants removed from the belt by the scrapers.

U.S. Pat. No. 3,640,394 to Brill et al. on Feb. 8, 1972 discloses a hose type skimmer for removing floating liquid hydrocarbon contaminants from surfaces of bodies of water. The skimmer includes a hose comprising an endless, substantially rigid loop of uniform circular cross section. The loop is gripped at an upper end thereof by a pair of opposed half-pulleys that move in opposite rotational directions to drivingly engaging the loop at diagonally opposite areas of the outer surface, one above and one below the center of a cross-section of the loop. The half-pulleys rotate the loop in a plane of its own passing a lower end thereof continuously into and out of the body of water for adherence of the liquid hydrocarbon contaminants. The adhered liquid hydrocarbon contaminants are removed from the loop into a receptacle by squeezing out upon passing through the half-pulleys, by using a hose engaging scraper, or by a blast of air. The lower end of the loop may oscillate up and down by the loop pivoting about an axis tangential to the loop at the half-pulleys. A modified version of the loop has a brushlike surface and a mating surface on the half-pulleys.

An improved type of oil skimmer utilizes a toothed drive pulley and a smooth guide pulley rotatably mounted using a pair of parallel shafts mounted to a support frame disposed adjacent and above the body of water with hydrocarbon contaminants. The pulleys engage an upper portion of a flexible skimmer hose which extends downwardly and horizontally floats on the surface of the body of water. The pulleys are driven by a motor and gear box combination to continuously move the skimmer hose. A vertically disposed fixed hose scraper disposed between the drive and guide pulleys engages the skimmer hose to remove adhered hydrocarbon contaminants therefrom which fall into a receptacle disposed therebelow. A removable safety housing may be attached to the support frame to shield the rotating drive and guide pulleys from interaction with persons during use.

Although these skimmer devices are adequate for the purpose for which they were intended, they have substantial drawbacks. The belt type skimmer devices are rather complex and reintroduce the floating contaminants into water by dragging the material back into the waste stream. The belt type skimmer utilize belts which are prone to breakage and are rather expensive, and the belt and other component parts must extend below the surface of the water which increases the likelihood of damage to the skimmer device. The hose type skimmer device requires extensive time and expense to replace broken toothed parts of the drive pulley and the whole guide pulley as a result of normal wear and tear. Also, the complete drive and pulley guides are sized to fit only one size and cross-sectional shape of skimmer hose. To change the drive and pulley shape to accommodate a different size and cross-sectional shape of skimmer hose would again require extensive time, expense, and engineering expertise. The shape and position of the skimmer hose scrapers are fixed and can only accommodate one size and cross-sectional shape of skimmer hose. The hose scrappers cannot compensate for variations in the position of the skimmer hose during operation resulting in ineffective scraping of the skimmer hose. The safety housing can be removed from both the belt and hose type skimmer, with the skimmer belt and hose still being drive, resulting in a hazardous safety condition.

Therefore, the need exists for an improved oil skimmer device having a drive pulley and a guide pulley that are quickly replaceable and which accommodate skimmer hoses of different cross-sectional sizes. The oil skimmer device needs adjustable scrapers to permit compensation for variations in the position of the skimmer hose during operation. The oiler skimmer device needs a safety housing which stops the skimmer hose when the safety housing is removed to prevent personal injury.

BRIEF SUMMARY OF THE INVENTION

Objectives and advantages are obtained by the improved oil skimmer of the present invention for removing liquid hydrocarbon contaminants floating on surfaces of bodies of water, the general nature of which may be stated as including: a support frame, respective drive pulley and guide pulleys rotatably mounted to the support frame on respective shafts; a drive train which rotatively drives the drive pulley and guide pulleys; a skimmer hose in the form of a loop which floats on water, being driven by the drive pulley onto and off the surface of the body of water to which the hydrocarbon contaminants adhere; a skimmer hose scraper for removing the hydrocarbon contaminants from the skimmer hose; and at least one of: 1) the drive and guide pulleys comprising replaceable, quick changing inner and outer pulley halves; 2) a movable safety housing with a safety block system which presses the skimmer hose into engagement with the drive pulley when assembled in an operative position and releases the skimmer hose when in an inoperative position to stop the skimmer hose; and 3) the skimmer hose scraper being adjustable to compensate for varying positioning of the skimmer hose.

The oil skimmer operates with an upper end of the skimmer hose disposed in a hose gripping groove of the drive pulley and a hose guiding groove of the guide pulley. A lower end of the skimmer hose extends downwardly and horizontally floating on the surface of the body of water. The drive train rotates the drive and guide pulleys to advance the skimmer hose by the drive pulley pulling the lower end of the skimmer hose that is coated with adhered hydrocarbon contaminants upwardly from the body of water. The skimmer hose travels over the guide pulley, through the skimmer hose scraper which scrapes adhered hydrocarbons therefrom which fall into a collector disposed below the oil skimmer, over the drive pulley, and back into the body of water. The skimmer hose continuously passes along the surface of the body of water collecting hydrocarbon contaminants from the body of water and being scraped therefrom into the collector.

The drive and guide pulleys are preferably comprised of replaceable, quick changing inner and outer drive pulley and guide pulley halves that sandwich respective central hubs therebetween to space the pulley halves to fit skimmer hoses of different cross-sectional sizes. The drive pulley halves include a plurality of radially-spaced hose gripping teeth are longitudinally inwardly disposed into a hose gripping groove from hose gripping surfaces thereof formed by a plurality of respective dependent radial tabs which extend radially outwardly of the inner and outer drive pulley halves. The tabs have respective toothed areas each of which contain the plurality of radially spaced hose gripping teeth. The guide pulley halves include a peripheral hose guiding groove defined by a pair of inwardly disposed annular hose guiding surfaces thereof to guide the skimmer hose. The central hubs with attached drive and guide pulley halves are preferably affixed to the drive shafts using a quick release device such as a nut which threads to respective mating threaded ends of the shafts.

The removable safety housing with safety block system preferably includes respective horizontal and vertical drive pulley safety blocks affixed to the safety housing to press the upper end of the skimmer hose into frictional engagement with the drive pulley. A guide pulley safety block affixed to the safety housing adjacent the guide pulley and disposed slightly spaced from the skimmer hose when said safety housing is in the operative position prevents undue movement of the skimmer hose away from said guide pulley during operation.

The skimmer hose scraper is preferably adjustable to compensate for varying positioning of the skimmer hose disposed between the drive and guide pulleys and the surface tension of the hydrocarbon contaminants to scrape adhered hydrocarbons therefrom, comprising respective fixed and adjustable skimmer hose scrapers disposed between the drive pulley and the guide pulley in a longitudinally spaced apart orientation along the skimmer hose. The fixed skimmer hose scraper is affixed to the safety housing and adapted for engaging the skimmer hose to scrape an upper one-half cross-section of the skimmer hose and cooperate with the adjustable skimmer hose scraper affixed to the support frame which scrapes an opposite lower one-half cross-section of the skimmer hose.

BRIEF DESCRIPTION OF THE SEVERAL VIEWS OF THE DRAWINGS

Preferred embodiments of the invention, illustrative of the best modes in which applicant contemplates applying the principles, are set forth in the following description and are shown in the drawings and are particularly and distinctly pointed out and set forth in the appended claims.

Similar numerals refer to similar parts throughout the drawings.

DETAILED DESCRIPTION OF THE INVENTION

The oil skimmer of the present invention is shown in FIGS. 1–6, and is indicated generally at 20, used for removing liquid contaminants floating on the surface of a body of water.

Figure 1:
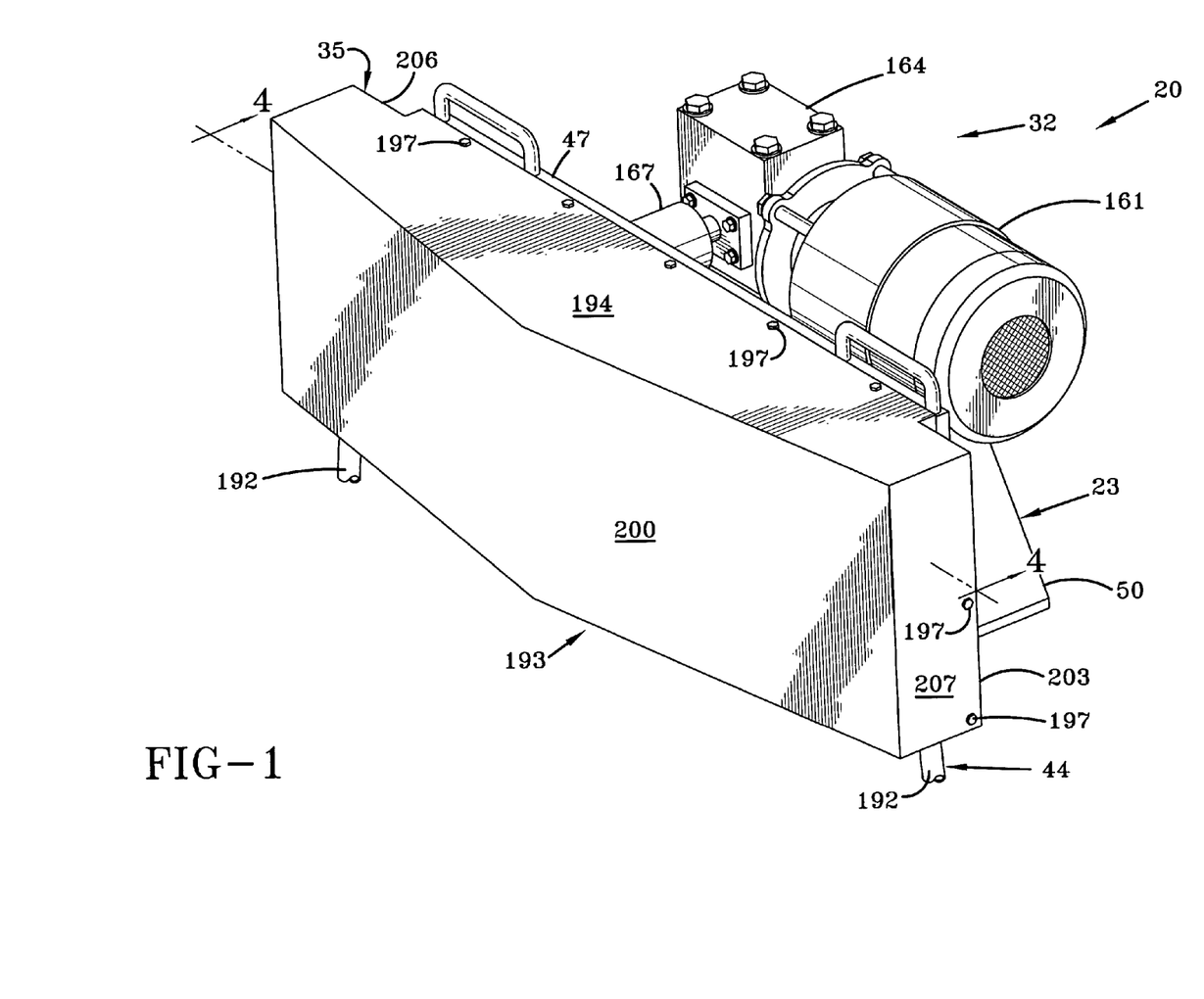
FIG. 1 is a front perspective view of the oil skimmer of the present invention with the safety cover attached.
Figure 2:
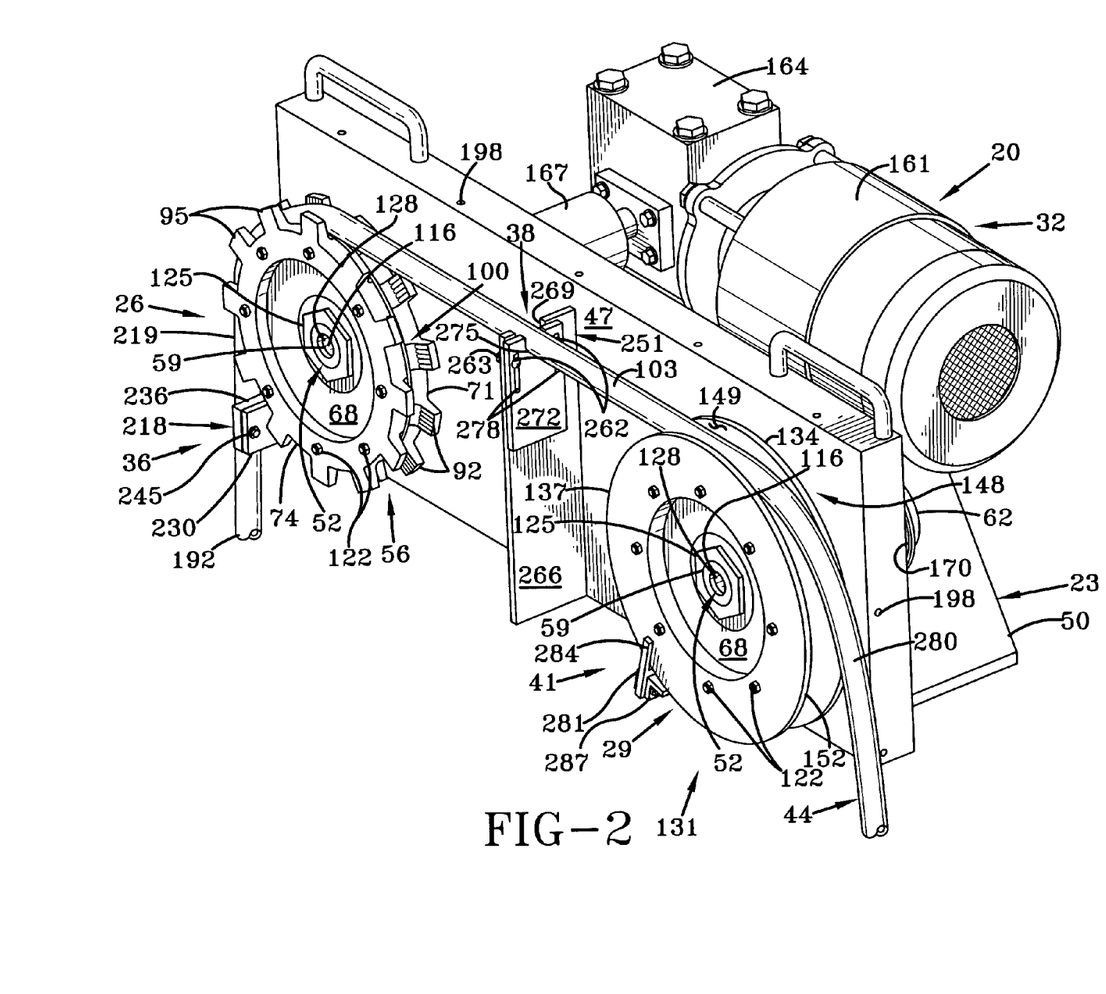
FIG. 2 is a front perspective view of the oil skimmer of FIG. 1 with the safety cover removed.

Referring to FIGS. 1 and 2 in the preferred embodiment, oil skimmer 20 includes a support frame 23, a drive pulley assembly 26, a guide pulley assembly 29, a drive train 32, a safety housing 35 (FIG. 1), a safety block system 36, a dual skimmer hose scraper 38, a guide pulley scraper 41, and a skimmer hose 44. All of the component parts except for the skimmer hose 44 are preferably made of a metal such as stainless steel, coated carbon steel, aluminum, or brass, though plastics or other suitable materials are useable in certain portions thereof as applicable. The support frame 23 preferably includes a thick vertical plate 47 and a dependent thin horizontal plate 50 for mounting to a support surface (not shown). The support frame is positioned adjacent the body of water supported at a level above the surface thereof so the skimmer hose 44 may drape downwardly onto the surface of the body of water to float thereon.

The drive pulley assembly 26 includes a drive shaft 52 rotatably mounted to the support frame 23 which extends through a bearing block 53 affixed to vertical plate 47 and which supports a drive pulley 56 for rotation at a front end 59, and a toothed pulley 62 keyed and set-screwed at a rear end 65 above the horizontal plate 50.

Figure 8:
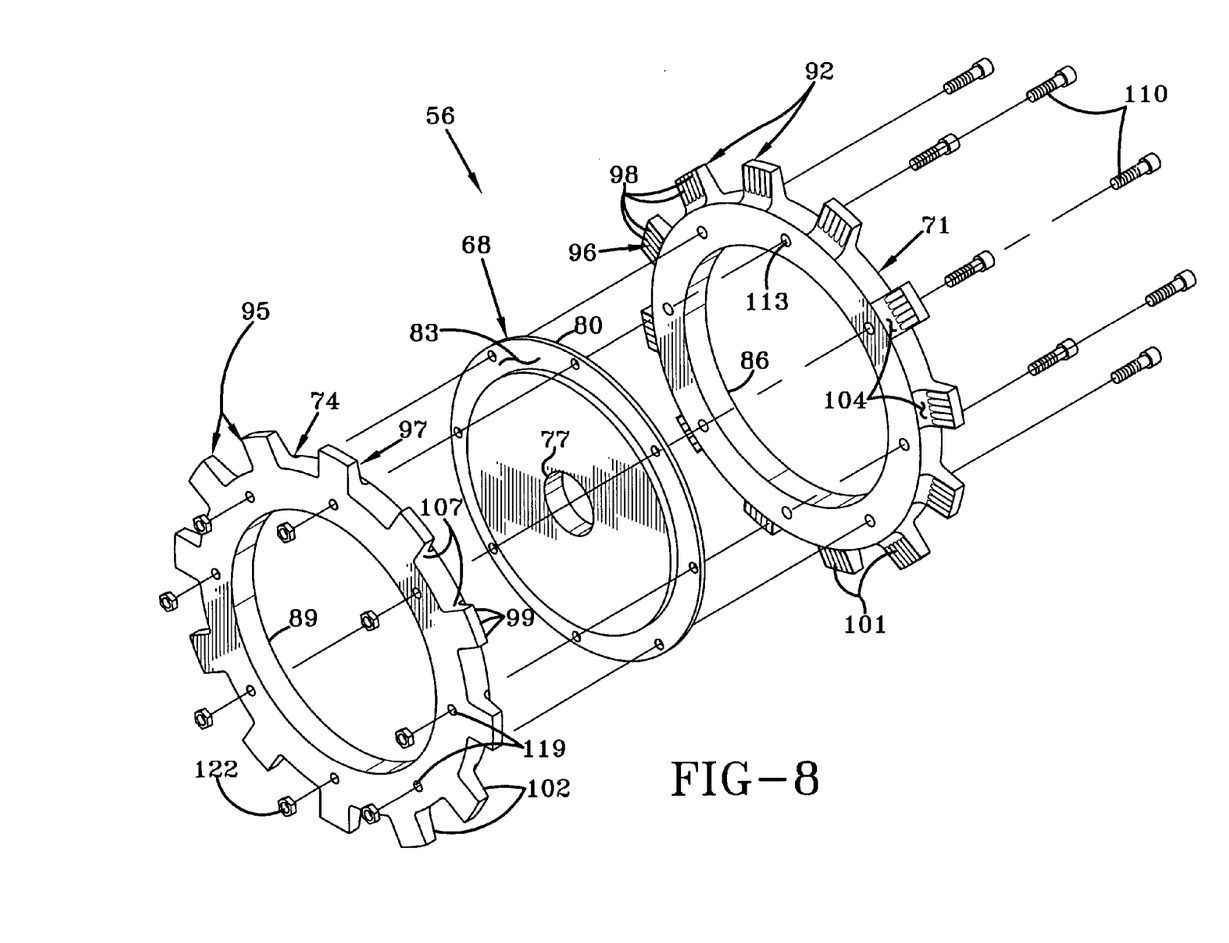
FIG. 8 is an exploded perspective view of the drive pulley.

In accordance with a first main feature of the invention, the drive pulley 56 consists of a replaceable central hub 68 which is coaxially removably affixed to and sandwiched between a pair of replaceable inner and outer drive pulley halves 71 and 74 to space apart the inner and outer drive pulley halves 71 and 74 to accommodate skimmer hoses 44 of differing cross-sectional sizes, the central hub 68 being removably coaxially affixed to the drive shaft 52 for rotation therewith, and the inner and outer drive pulley halves 71 and 74 which are operatively affixed to the drive shaft 52 through the central hub 68. The central hub 68 includes a central bore 77 and a pair of opposed peripheral recesses 80 and 83. The inner and outer drive pulley halves 71 and 74 include respective inner bores 86 and 89 which closely fit to the respective peripheral recesses 80 and 83 of the central hub 68. A plurality of respective dependent radial tabs 92 and 95 extend radially outwardly from inner and outer drive pulley halves 71 and 74, having respective toothed areas 96 and 97 which contain a plurality of radially-spaced hose gripping teeth 98 and 99 longitudinally inwardly disposed into a hose gripping groove 100 formed by respective hose gripping surfaces 101 and 102 to grip an upper end 103 of the skimmer hose 44, being supported by respective smooth inwardly curved areas 104 and 107 of the radial tabs disposed radially inwardly of the toothed areas 96 and 97 to support the skimmer hose 44. The peripheral recesses 80 and 83 of central hub 68 are sandwiched between the inner and outer drive pulley halves 71 and 74, being retained together by a plurality of removable fasteners comprising allen head bolts 110 that extend through a plurality of counterbored clearance holes 113 through innerdrive pulley half 71, through a plurality of corresponding clearance holes 116 of central hub 68, and through a plurality of corresponding clearance holes 119 of outer drive pulley half 74, and a plurality of nuts 122 which thread onto allen head bolts 110.

Figure 7:
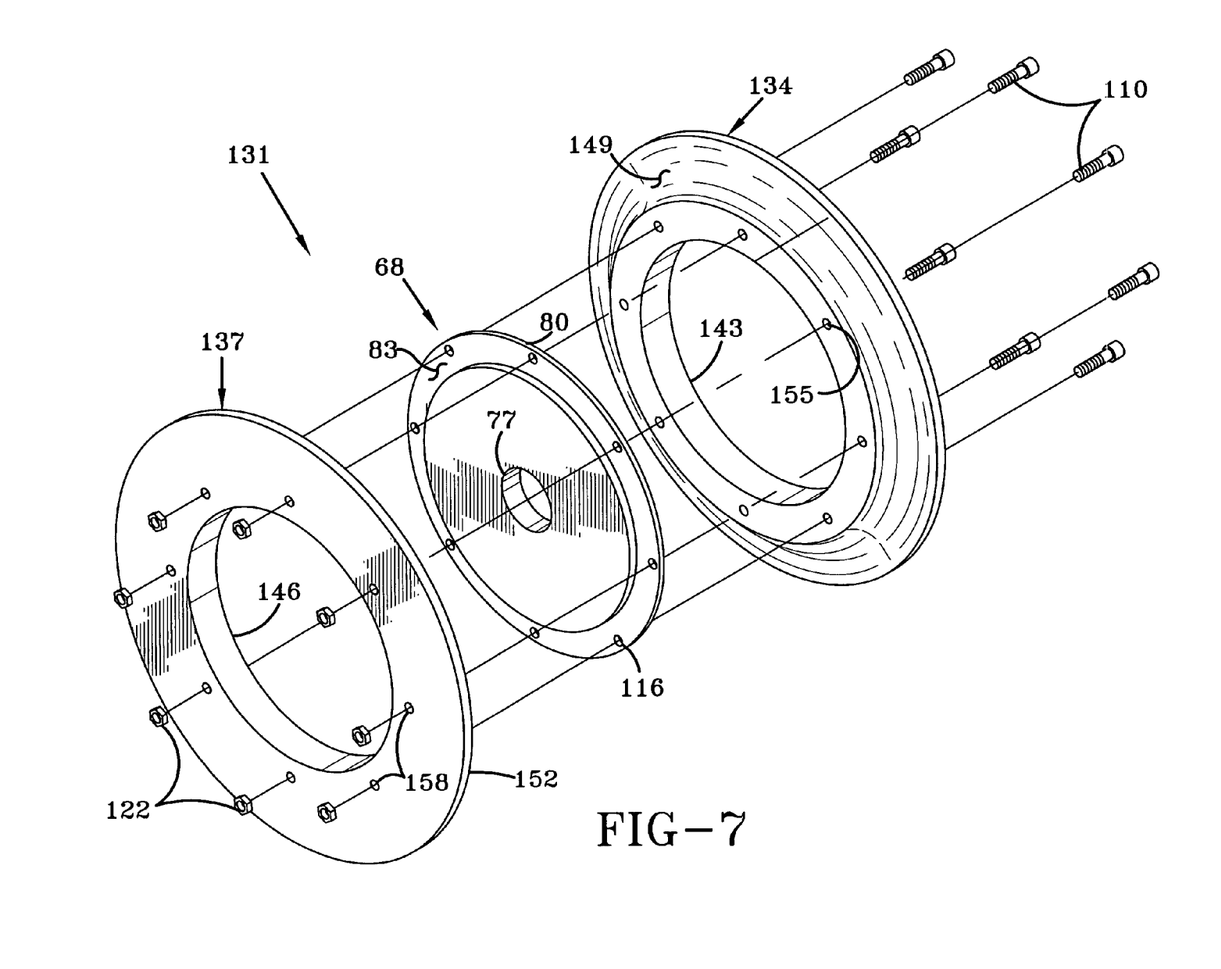
FIG. 7 is an exploded perspective view of the guide pulley.

In accordance with a second main feature of the invention, the central bore 77 of central hub 68 closely fits onto and is keyed or splined to a non-threaded section (not shown) of the front end 59 of drive shaft 52 for rotation therewith, being retained thereto abutting a shoulder (not shown) of drive shaft 52 by a quick release device comprising a single quick release nut 125 which threads onto an externally threaded section 128 of front end 59, which operatively affixes the inner and outer drive pulley halves 71 and 74 to the drive shaft 52 while allows quick connection and release. In accordance with another of the main features of the invention, the guide pulley assembly 29 includes a drive shaft 52 rotatably mounted to the support frame 23 which extends through a bearing block 53 affixed to vertical plate 47 and which supports a guide pulley 131 for rotation in a coplanar, horizontally spaced relationship with the drive pulley 56 at the front end 59, and a toothed pulley 62 at the rear end 65 above the horizontal plate 50.

In accordance with the first main feature of the invention, the guide pulley 131 consists of a replaceable central hub 68 which is coaxially removably affixed sandwiched between a pair of replaceable inner and outer guide pulley halves 134 and 137 to space the inner and outer guide pulley halves 134 and 137 to accommodate skimmer hoses 44 of differing cross-sectional sizes, the central hub 68 being removably coaxially affixed to the drive shaft 52 for rotation therewith, and the inner and outer guide pulley halves 134 and 137 which are operatively affixed to the drive shaft 52 through the central hub 68. The inner and outer guide pulley halves 134 and 137 include respective inner bores 143 and 146 which closely fit to the respective peripheral recesses 80 and 83 of the central hub 68. The inner and outer guide pulley halves 134 and 137 include a peripheral hose guiding groove 148 formed between respective inwardly disposed, curved hose guiding surfaces 149 and 152 which guide the upper end 103 of the skimmer hose 44. The peripheral recesses 80 and 83 of central hub 68 are sandwiched between the inner and outer guide pulley halves 134 and 137, being retained together by a plurality of the removable fasteners comprising the alien head bolts 110 that extend through a plurality of counterbored clearance holes 155 through inner guide pulley half 134, through the corresponding clearance holes 116 of central hub 68, and through a plurality of corresponding clearance holes 158 of outer guide pulley half 137, and a plurality of nuts 122 which thread onto allen bolts 110.

In accordance with the second main feature of the invention, the central bore 77 of central hub 68 closely fits onto and is keyed or splined to a non-threaded section (not shown) of the front end 59 of drive shaft 52 for rotation therewith, being retained thereto abutting the shoulder of drive shaft 52 by a quick release device comprising a single quick release nut 125 which threads onto the externally threaded section 128 of front end 59, which operatively affixes the inner and outer guide pulley halves 134 and 137 to the drive shaft 52 while allows quick connection and release.

Figure 3:
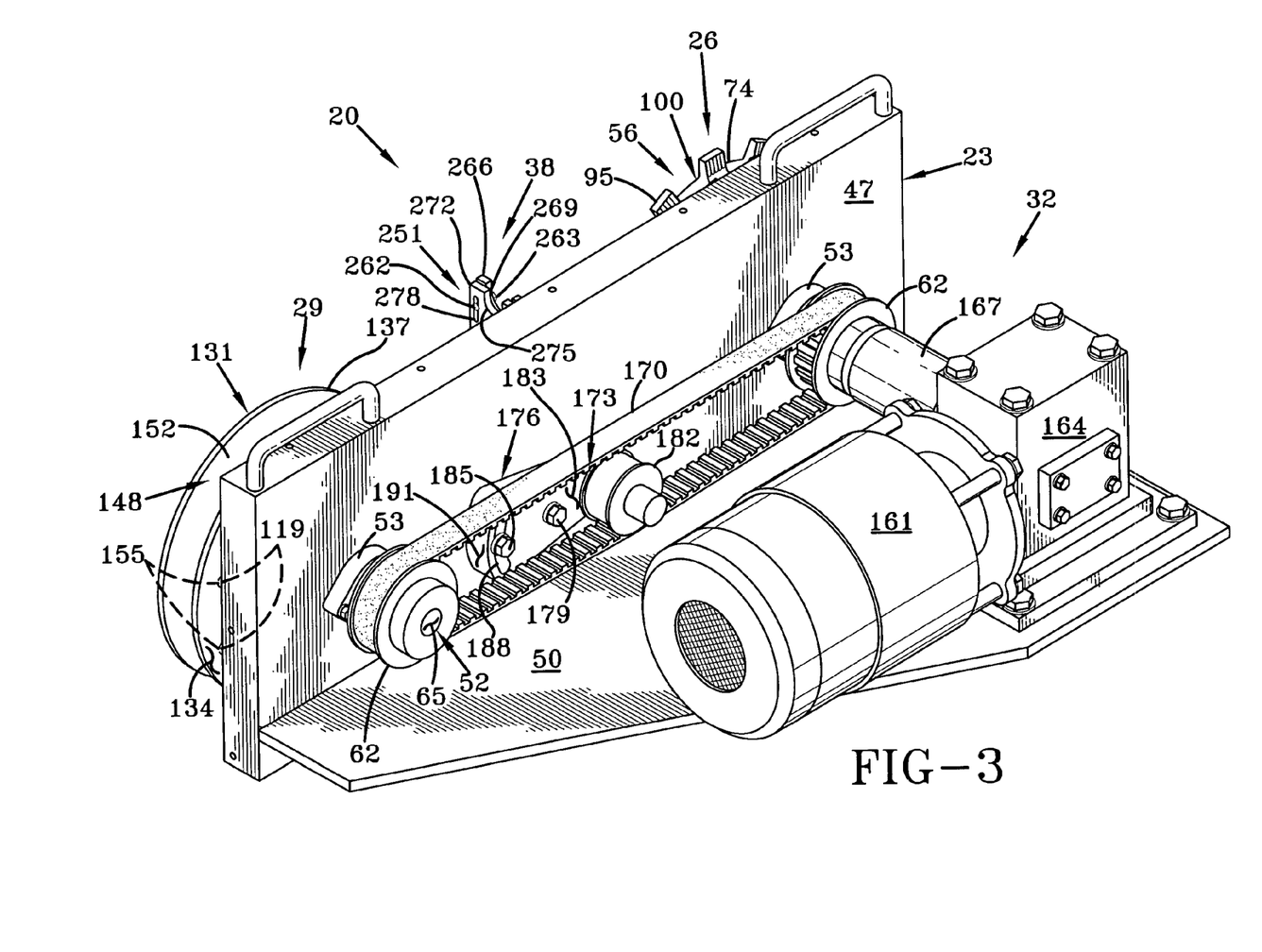
FIG. 3 is a rear perspective view of the oil skimmer of FIG. 1 with the safety cover removed, and showing the drive train.

The drive train 32 is mounted to the support frame 23 and coupled to the drive shafts 52 for rotative driving thereof, and includes an electric motor 161 which drives a reducing gear box 164 bolted to horizontal plate 50 and having an output tube 167 which houses an output shaft (not shown) that is keyed to one of the toothed pulleys 62. A ribbed connecting belt 170 is looped about the toothed pulleys 62 to simultaneously drive both the drive pulley 56 and the guide pulley 131. A tensioning assembly 173 includes a tensioning arm 176 which is pivotally connected to the vertical plate 47 at a pivot bolt 179. A tensioning roller 182 rotationally connected to a first end 183 of tensioning arm 176 engages the connecting belt 170, being held in position thereagainst by a tensioning bolt 185 which rides in an arcuate slot 188 radiused about the pivot bolt 179 at a second end 191 of tensioning arm 176. The upper end 103 of skimmer hose 44 is disposed in the hose gripping groove 100 of drive pulley 56 and hose guiding groove 148 of guide pulley 131, and a lower end 192 of the skimmer hose 44 which extends downwardly therefrom to horizontally float on the surface of the body of water.

The safety housing 35 is movably connected to the support frame 23 and is adapted to partially enclose the drive pulley 56 and the guide pulley 131, with an open bottom 193 which permits the skimmer hose 44 to enter and exit therefrom. The safety housing 35 connects to the support frame 23 in the operative position and is removable from the support frame 23 to the inoperative position at a top panel 194 that connects to the vertical plate 47 using a plurality of screw fasteners comprising bolts 197 which thread into respective threaded holes 198. A downwardly dependent front panel 200, a pair of downwardly dependent short rear panels 203 and 206, and a pair of downwardly dependent side panels 207 and 208 extend from top panel 194. The safety housing 35 has an operative position disposed about the drive pulley 56 and the guide pulley 131 and an inoperative position positioned away from pulley 56 and pulley 131 removed therefrom by removing bolts 197.

Figure 4:
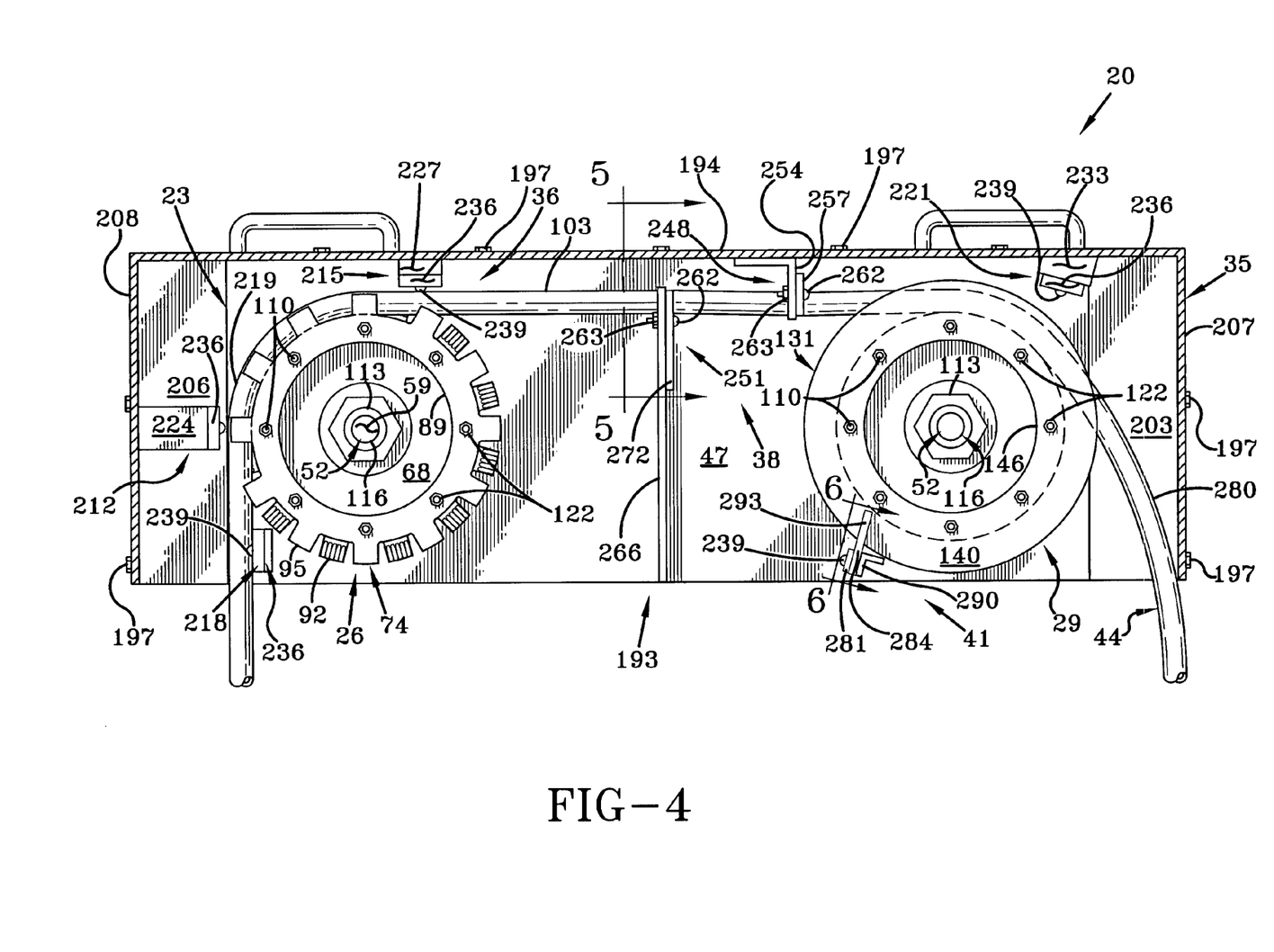
FIG. 4 is a lateral vertical sectional view of the oil skimmer taken along line 4—4, FIG. 1 showing the three safety blocks affixed to the safety housing.

In accordance with yet another main feature of the invention, the safety block system 36 consists of respective horizontal and vertical drive pulley safety blocks 212 and 215 affixed to the safety housing 35 which press the upper end 103 of the skimmer hose 44 into frictional engagement with the drive pulley 56 for pulling thereby when the safety housing 35 is in the operative position, and which moves away from the skimmer hose 44 when the safety housing 35 is in the inoperative position such that the skimmer hose 44 is not pulled thereby and stops moving. A horizontal drive pulley stripping block 218 is affixed to the vertical plate 47 of support frame 23 so as to be disposed contacting the skimmer hose 44 to strip an outgoing end 219 thereof from the drive pulley 56. An angled guide pulley safety block 221 is affixed to the safety housing 35 adjacent the guide pulley 131, being downwardly disposed from the safety housing 35 at an inwardly tilted angle toward the guide pulley 131. The angled guide pulley safety block 221 is disposed slightly spaced from the skimmer hose 44 when the safety housing 35 is in the operative position to prevent undue movement of the skimmer hose 44 away from the guide pulley 131 during operation.

Each of the safety blocks 212, 215, and 221, and the stripping block 218 include respective brackets 224, 227, 230, and 233 affixed to respective of the support frame 23 and the safety housing 35, and an attached wear-resistant rub block 236 which engages the skimmer hose 44. The rub blocks 236 are connected to the respective brackets 224, 227, 230, and 233 using a plurality of screw fasteners comprising screws 239 which thread into mating threaded holes (not shown) of the brackets 224, 227, 230, and 233. The rub blocks 236 are removable from the brackets 224, 227, 230, and 233 for replacement when worn out from contact with the skimmer hose 44.

Figure 5:
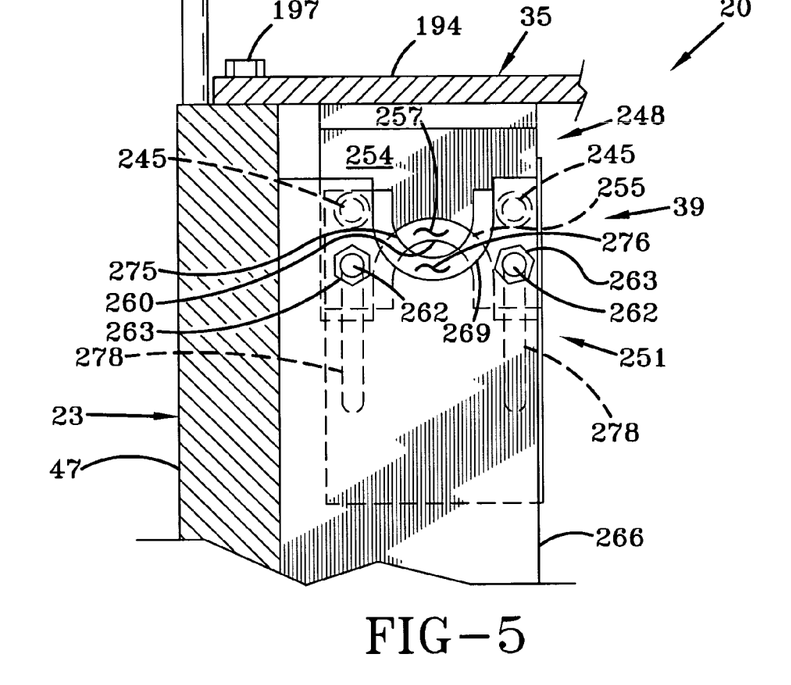
FIG. 5 is a longitudinal vertical sectional view of the oil skimmer taken along line 5—5, FIG. 4 showing the details of the fixed upper scraper.
Figure 6:
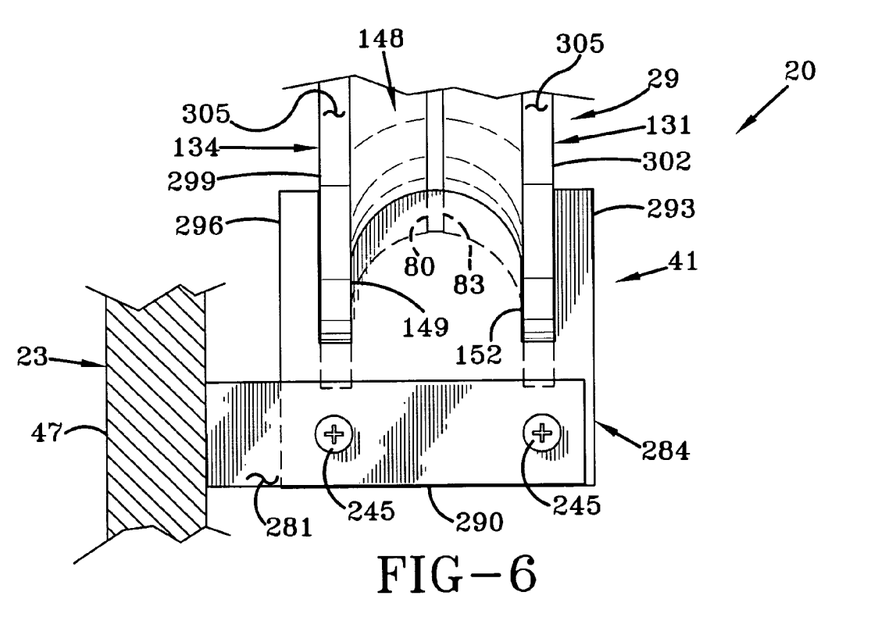
FIG. 6 is a longitudinal vertical sectional view of the oil skimmer taken along line 6—6, FIG. 4 showing the details of the adjustable lower scraper.

In accordance with another feature of the invention, the dual skimmer hose scraper 38 includes a fixed upper scraper 248 affixed to the safety housing and operatively associated with the support frame 23, being adapted for engaging the skimmer hose 44 to scrape one-half cross-section of the skimmer hose 44, and cooperate with an adjustable lower scraper 251 which scrapes an opposite one-half cross-section of the skimmer hose 44. The fixed upper scraper 248 and the adjustable lower scraper 251 are both disposed between the drive pulley 56 and the guide pulley 131 in a longitudinally spaced apart orientation along the skimmer hose 44 for engaging the outer surface of the skimmer hose 44, adjustable lower scraper 251 being in an adjustable manner to compensate for varying positioning of the skimmer hose 44 to scrape adhered hydrocarbons therefrom.

The fixed upper scraper 248 includes an angle bracket 254 having a downwardly open clearance slot 255, being affixed to the top panel 194 of safety housing 35, and a fixed upper scraper plate 257 having a downwardly open upper scraper slot 260 of a size to closely receive and engage an upper one-half cross-section of the skimmer hose 44. The fixed upper scraper plate 257 is connected to the angle bracket 254 using a pair of screws 262 and nuts 263.

The adjustable lower scraper 251 includes a non-movable, lower mounting bracket 266 affixed to the vertical plate 47 of support frame 23 having an upwardly open clearance slot 269. A movable lower scraper plate 272 has an upwardly open lower scraper slot 275 of a size as to closely receive and engage a lower one-half cross-section of the skimmer hose 44. The movable lower scraper plate 272 includes a pair of vertical adjustment slots 278 and is movably affixed to the lower mounting bracket 266 using a pair of the screw fasteners comprising screws 262 and nuts 263 that extend through the respective vertical adjustment slots 278 and corresponding holes (not shown) through the lower mounting bracket 266. The upper and lower scrapers 248 and 251 capture the skimmer hose 44 therebetween when the safety housing 35 is in the operative position and releases the skimmer hose 44 in the inoperative or removed position of safety housing 35.

The guide pulley scraper 41 is affixed to the support frame 23 for engaging the guide pulley 131 to scrape the hydrocarbon contaminants therefrom deposited while an incoming end 280 of skimmer hose 44 coated with adhered hydrocarbon contaminants travels therearound prior to being scraped. The guide pulley scraper 41 includes a horizontal scraper plate 281 affixed to the vertical plate 47 of support frame 23, a U-shaped scraper plate 284, and an angled scraper plate 287. The U-shaped scraper plate 284 includes a transverse base 290 and a pair of dependent upright legs 293 and 296 which scrape the hydrocarbon contaminants from respective side surfaces 299 and 302 of the guide pulley 131. The U-shaped scraper plate 284 at the transverse base 290 and the angled scraper plate 287 are connected to the horizontal scraper plate 281 using a pair of the screws 239 which thread into mating threaded holes (not shown) of angled scraper plate 287. The angled scraper plate 287 scrapes the hydrocarbon contaminants from a peripheral surface 305 of guide pulley 131.

The skimmer hose 44 is made of a generally flexible material such as rubber with or without internal cloth, fiberglass, or other reinforcement, synthetic rubber, or other rubberlike material having an outer surface to which the hydrocarbon contaminants adhere. The skimmer hose 44 is preferably of a uniform, generally circular cross-section and formed into a continuous loop. The skimmer hose has a density that is lower than water so as to float on the surface of the body of water, being either of a hollow or solid construction. Where the materials from which the skimmer hose 44 is made have an overall specific gravity less than water, the skimmer hose 44 may be constructed of a solid cross-section. Otherwise, the skimmer hose 44 must be hollowed to provide the necessary buoyancy.

The drive train 32 rotatively drives the drive pulley 56 to advance the skimmer hose 44 by frictional engagement with the drive pulley 56 which pulls the lower end 192 of the skimmer hose 44 coated with adhered hydrocarbon contaminants upwardly from the body of water, around the guide pulley 131, through the dual skimmer hose scraper 38 to scrape the adhered hydrocarbons therefrom into a collector receptacle or drain pipe (not shown) positioned therebelow to catch the hydrocarbon contaminants scraped from the outer surface of the skimmer hose, which is continuously carried away by a pipe or periodically drained. The skimmer hose 44 continues around the drive pulley 56 and back into the body of water such that the skimmer hose 44 continuously removes the hydrocarbon contaminants from the body of water into the collector.

Many variations to the present invention while staying within the same inventive concept. For example, it is understood that the upper and lower hose scrapers may be replaced by other known devices to remove adhered hydrocarbon contaminants such as a pair of contoured squeeze rollers or a blast of air. The safety housing can be hingedly connected to the support frame by modifying the angle of the skimmer hose scrapers connected to the safety housing to tangent to the hinge point to accommodate the pivoting motion thereof. Also, although the skimmer hose is preferably of a generally circular cross-section, it may be of other cross-sectional shapes. For example, the cross-section may be slightly oblong, elliptical, or other shapes may be used depending upon the application to rotate the skimmer hose as it passes along the surface of the body of water to maximize adherence of hydrocarbon contaminants on the entire outer surface thereof. The skimmer hose may also have a brush-like surface as is known in the art to maximize the area of the hydrocarbon contaminant collecting outer surface thereof, though this is better used with the contoured squeeze rollers or a motor driven paddle wheel than scrapers due to the irregular outer surface thereof. Further, it is understood that while in the preferred embodiment the central hub is sandwiched between the inner and outer pulley halves, the central hub may be eliminated, being integrated into one or both thereof.

Accordingly, the oil skimmer provides a drive pulley and a guide pulley that are quickly replaceable, quickly disconnecting and reconnecting from the drive shafts using a single quick release nut, that accommodates skimmer hoses of different cross-sectional sizes by having interchangeable pulley halves and hubs, that has a scraper that is adjustable to permit compensation for variations in the position of the skimmer hose during operation, and that has a safety housing which stops the skimmer hose when removed to prevent personal injury which achieves all the enumerated objectives, provides for eliminating difficulties encountered with prior art devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved oil skimmer is constructed and used, the characteristics of the construction, and the advantageous, new and useful results obtained; the new and useful structures, devices, elements, arrangements, parts and combinations, are set forth in the appended claims.

What is claimed is:

1. An oil skimmer for removing contaminants floating on the surface of a body of liquid comprising:
   a support frame adapted to be positioned adjacent the body of liquid;
   a skimmer hose made of a generally flexible material having an outer surface adapted to adhere the contaminants thereto;
   a drive pulley rotatably mounted on the support frame for driving the skimmer hose;
   a guide pulley rotatably mounted on the support frame for guiding the skimmer hose;
   at least one skimmer hose scraper for engaging the outer surface of the skimmer hose whereby the scraper is adapted to scrape adhered contaminants therefrom;
   a safety housing which is mounted on the support frame and movable between an inoperative position and an operative position partially enclosing the drive and guide pulleys and permitting the skimmer hose to enter and exit therefrom;
   at least one drive pulley safety block which is mounted on the safety housing and presses the skimmer hose into frictional engagement with the drive pulley when the safety housing is in the operative position and disengages from the skimmer hose when the safety housing is in the inoperative position; and
   a guide pulley safety block which is mounted on the safety housing adjacent the guide pulley when the safety housing is in the operative position to prevent undue movement of the skimmer hose away from the guide pulley.

2. The oil skimmer of claim 1 wherein
   at least one of said drive pulley and guide pulley has replaceable inner and outer pulley halves and is adapted to receive said skimmer hose in a peripheral hose gripping groove formed between respective inwardly disposed hose gripping surfaces thereof.

3. The oil skimmer defined in claim 2 in which the inner and outer drive pulley halves and guide pulley halves include respective inner bores, and in which at least one of said drive pulley and guide pulley includes a replaceable central hub which is removably positioned respectively between at least one of said inner and outer drive pulley halves and guide pulley halves to space said inner and outer drive pulley halves and guide pulley halves to accommodate skimmer hoses of differing cross-sectional sizes, each central hub being removably coaxially affixed to a respective one of the first and second drive shafts for rotation therewith.

4. The oil skimmer defined in claim 3 in which each central hub includes a central bore adapted to be keyed to a respective one of the first and second drive shafts for rotation therewith.

5. The oil skimmer defined in claim 4 in which the central hub includes a pair of opposed peripheral recesses, the inner bores of one of the inner and outer drive pulley halves and guide pulley halves having a complementary shape to fit said peripheral recesses of said central hubs.

6. The oil skimmer defined in claim 2 in which the hose gripping surfaces of the inner and outer drive pulley halves are formed by a plurality of respective dependent tabs which extend radially outwardly of said inner and outer drive pulley halves, said tabs having respective toothed areas each of which contain the plurality of radially spaced hose gripping teeth.

7. The oil skimmer defined in claim 6 in which the radial tabs include respective smooth inwardly curved areas disposed radially inwardly of the toothed areas to support the skimmer hose.

8. The oil skimmer defined in claim 2 in which at least one of the inner and outer drive pulley halves and guide pulley halves are operatively affixed to a respective one of the first and second drive shafts using a quick release device which threads to respective mating threaded ends of said first and second drive shafts.

9. The oil skimmer defined in claim 8 in which the threaded end of the first and second drive shafts are externally threaded, and the quick release devices comprise respective quick release nuts that thread onto said threaded ends.

10. The oil skimmer defined in claim 2 in which the inner and outer drive pulley halves and the inner and outer guide pulley halves are respectively affixed together by a plurality of removable fasteners.

11. The oil skimmer defined in claim 10 in which the removable fasteners comprise bolts that extend through corresponding clearance holes through at least one of each inner and outer drive pulley and guide pulley half and are secured to corresponding of the inner and outer drive pulley and guide pulley halves.

12. The oil skimmer defined in claim 11 in which the bolts extend through corresponding clearance holes through both the inner and outer drive pulley and guide pulley halves and are secured using corresponding nuts.

13. The oil skimmer defined in claim 2 in which the hose scraper is positioned intermediate the drive and guide pulley.

14. The oil skimmer of claim 1 wherein the at least one drive pulley safety block includes first and second drive pulley safety blocks.

15. The oil skimmer of claim 14 wherein the first safety block is disposed laterally of the drive pulley and the second safety block is disposed upwardly of the drive pulley.

16. The oil skimmer of claim 1 further comprising a stripping block mounted on the support frame adjacent the drive pulley for stripping the skimmer hose outgoing from the drive pulley.

17. The oil skimmer of claim 1 wherein the guide pulley safety block is slightly spaced from the skimmer hose when the safety housing is in the operative position.

18. The oil skimmer of claim 1 wherein the guide pulley safety block is mounted on the safety housing whereby the guide pulley safety block moves away from the guide pulley when the safety housing is in the inoperative position.

19. The oil skimmer of claim 1 wherein the safety housing is removably mounted on the support frame whereby the safety housing is removed from the support frame to the inoperative position.

20. The oil skimmer of claim 1 wherein the at least one skimmer hose scraper includes first and second hose scrapers.

21. The oil skimmer of claim 20 wherein the skimmer hose scrapers are disposed intermediate the drive pulley and the guide pulley in a longitudinally spaced apart orientation along the skimmer hose.

22. The oil skimmer of claim 21 wherein the first hose scraper is an upper scraper disposed for scraping an upper half of the skimmer hose and the second hose scraper is a lower scraper disposed for scraping a lower half of the skimmer hose; and wherein the upper scraper is disposed intermediate the lower scraper and the guide pulley whereby the upper scraper scrapes the upper half of the skimmer hose outgoing from the guide pulley prior to the lower scraper scraping the lower half of the skimmer hose outgoing from the guide pulley.

23. The oil skimmer of claim 22 wherein the lower scraper is mounted on the support frame and the upper scraper is mounted on the safety housing whereby the upper scraper is moved away from and disengages the skimmer hose when the safety housing is in the inoperative position.

24. The oil skimmer of claim 22 wherein one of the upper and lower scrapers is adjustable toward and away from the skimmer hose.

25. The oil skimmer of claim 24 wherein the lower scraper includes a non-movable mounting bracket affixed to the support frame and a scraper plate movably mounted on the non-movable mounting bracket.

26. The oil skimmer of claim 1 wherein the skimmer hose is in a non-advancing state when the safety housing is in the inoperative position.

27. The oil skimmer of claim 1 wherein the drive pulley safety block moves away from the skimmer hose as the safety housing moves from the operative to the inoperative position.

28. The oil skimmer of claim 1 wherein a guide pulley scraper is affixed to the support frame for engaging the guide pulley to scrape the contaminants therefrom.

29. The oil skimmer of claim 28 wherein the guide pulley scraper includes a U-shaped scraper plate having a transverse base and a pair of upright legs which scrape the contaminants from respective side surfaces of the guide pulley.

30. An oil skimmer for removing contaminants floating on the surface of a body of liquid comprising:
  a support frame adapted to be positioned adjacent the body of liquid;
  a skimmer hose made of a generally flexible material having an outer surface adapted to adhere the contaminants thereto;
  a drive pulley rotatably mounted on the support frame for driving the skimmer hose;
  a guide pulley rotatably mounted on the support frame for guiding the skimmer hose;
  at least one skimmer hose scraper for engaging the outer surface of the skimmer hose whereby the scraper is adapted to scrape adhered contaminants therefrom;
  a safety housing which is mounted on the support frame and movable between an inoperative position and an operative position partially enclosing the drive and guide pulleys and permitting the skimmer hose to enter and exit therefrom;
  at least one drive pulley safety block which is mounted on the safety housing and presses the skimmer hose into frictional engagement with the drive pulley when the safety housing is in the operative position and disengages from the skimmer hose when the safety housing is in the inoperative position; and
  each safety block includes a wear-resistant rub block for engaging the skimmer hose wherein each rub block is removably mounted for replacement.

31. The oil skimmer of claim 30 wherein the skimmer hose is in a non-advancing state when the safety housing is in the inoperative position.

32. The oil skimmer of claim 30 wherein the safety housing is removably mounted on the support frame whereby removal of the safety housing from the support frame moves the safety housing into the inoperative position.

33. The oil skimmer of claim 30 wherein the at least one drive pulley safety block includes first and second drive pulley safety blocks.

34. The oil skimmer of claim 33 wherein the first safety block is disposed laterally of the drive pulley and the second safety block is disposed upwardly of the drive pulley.

* * * * *